US009187262B2

(12) United States Patent
Fahldieck

(10) Patent No.: US 9,187,262 B2
(45) Date of Patent: Nov. 17, 2015

(54) TRANSFER STAR-WHEEL

(75) Inventor: Andreas Fahldieck, Idar-Oberstein (DE)

(73) Assignee: KHS GmbH, Dortmund (DE)

(*) Notice: Subject to any disclaimer, the term of this patent is extended or adjusted under 35 U.S.C. 154(b) by 0 days.

(21) Appl. No.: 14/350,843

(22) PCT Filed: Sep. 6, 2012

(86) PCT No.: PCT/EP2012/003734
§ 371 (c)(1),
(2), (4) Date: Apr. 10, 2014

(87) PCT Pub. No.: WO2013/053417
PCT Pub. Date: Apr. 18, 2013

(65) Prior Publication Data
US 2014/0251766 A1   Sep. 11, 2014

(30) Foreign Application Priority Data
Oct. 11, 2011  (DE) .......................... 10 2011 115 512

(51) Int. Cl.
*B65G 47/84*   (2006.01)
*B67C 7/00*    (2006.01)

(52) U.S. Cl.
CPC ............ *B65G 47/846* (2013.01); *B67C 7/0046* (2013.01)

(58) Field of Classification Search
CPC .................................................. B65G 47/846
USPC .......... 198/346.2, 440, 441, 449, 450, 463.2, 198/469.1, 474.1, 475.1, 476.1, 575, 576, 198/608, 620, 803.8, 803.11, 867.06
See application file for complete search history.

(56) References Cited

U.S. PATENT DOCUMENTS

| 4,125,184 | A  | * | 11/1978 | Seragnoli ...................... 198/442 |
| 4,467,908 | A  | * | 8/1984  | Schneider ..................... 198/441 |
| 4,697,691 | A  | * | 10/1987 | Zodrow et al. ................ 198/426 |
| 6,446,781 | B1 |   | 9/2002  | De Villele |
| 6,889,823 | B2 |   | 5/2005  | Delaporte et al. |
| 7,200,975 | B2 | * | 4/2007  | Till ................................ 53/253 |
| 8,028,815 | B2 | * | 10/2011 | Hahn ......................... 198/347.1 |
| 8,051,971 | B2 | * | 11/2011 | Marti Sala .................... 198/392 |
| 8,561,783 | B2 | * | 10/2013 | McAllister et al. ........ 198/473.1 |
| 8,657,101 | B2 | * | 2/2014  | Zoni et al. .................... 198/608 |

FOREIGN PATENT DOCUMENTS

| DE | 195 42 647      | 5/1997 |
| DE | 10 2009 018 733 | 11/2010 |
| EP | 1 883 594       | 7/2010 |
| WO | WO 2008/129346  | 10/2008 |

* cited by examiner

*Primary Examiner* — Douglas Hess
(74) *Attorney, Agent, or Firm* — Occhiuti & Rohlicek LLP

(57) ABSTRACT

A transfer star-wheel includes a takeover point, a handover point, transmission elements, and a transport path. The star-wheel receives containers from a first container treatment device at the takeover point transfers them to the handover point, and passes them to the second container treatment device. The transport path has inner and outer guide rails between which containers are guided and transported in a suspended and sliding manner. A first linear transport path section is provided at the takeover point. Each transmission element is associated with a corresponding container. Each of the containers is radially displaceable relative to a transmission element to which it corresponds as it is transported on the transport path.

22 Claims, 5 Drawing Sheets

TRANSFER STAR-WHEEL

RELATED APPLICATIONS

This application is the national stage entry under 35 USC 371 of PCT/EP2012/003734, filed on Sep. 6, 2012, which claims the benefit of the Oct. 11, 2011 priority date of German application 10 2011 115 512.4, the contents of which are herein incorporated by reference.

FIELD OF INVENTION

The invention relates to container processing, and in particular, to transfer star-wheels.

BACKGROUND

A transfer star-wheel can transfer containers along a circular path from a first container treatment device to a second container treatment device. When seen in plan view, a handover point and a takeover point are preferably disposed opposite one another at the transfer star-wheel.

Instead of the transfer star-wheel, however, a linear conveyor or chain conveyor can be provided. Such a conveyor can have circular deflection devices between individual branches, it being possible to transfer the containers from the first to the second container treatment device.

The handover and takeover happens in an advantageous manner at or near the respective deflection devices. The container treatment devices can have a star-wheel design, with the first container treatment device, for example, being a filler star-wheel, or filler, and the second container treatment device being a sealer star-wheel, or sealer. The transfer star-wheel transports, for example, containers filled with product from the filler star-wheel to the sealer star-wheel.

Container treatment devices are usually larger in diameter than the transfer star-wheel or than the deflection devices of the linear conveyor. As a result, the speed of the devices at both the handover point and takeover point is preferably selected so that equal peripheral speeds prevail. What the exemplary embodiments have in common therefore is that, at the handover and takeover point, there should be a matching speed, i.e. an equal or approximately equal peripheral speed, so that a handover to the sealer star-wheel or a takeover from the filler star-wheel can take place smoothly and without any complications.

Nevertheless the handover and/or takeover does not take place smoothly because the centrifugal acceleration abruptly changes the effective direction and increases still further upon the change from large to small star-wheel diameter. As a result of this, the material or product with which the container has been filled, for example a liquid, can spill from the container. The resulting loss of product from spillage fouls the installation, which leads to an additional cleaning requirement. In addition, loss from spillage also results in containers that are insufficiently filled. As a result, the container and the filled product would be separated out in a subsequent inspection.

The containers also undergo a considerable centripetal acceleration, which adversely affects the product level of the filled product. For example, as a result of this acceleration, the liquid level assumes an oblique attitude. This can again result in spillage, with the result that containers are not completely filled.

SUMMARY

The object of the invention is an improved device of the type referred to above that avoids at least the aforesaid disadvantages.

In one aspect, the invention features a transfer star-wheel that, at a takeover point, takes containers, such as bottles, from a first container treatment device and transports them along a transport path to a handover point at which the container is passed to a second container treatment device, with a plurality of transmission elements being provided.

In one aspect, the invention features a transport path that comprises at least one inner guide rail and one outer guide rail between which the containers can be guided and transported in a suspended and sliding manner, with a first linear transport path section being provided at the takeover point of the containers and with a container being at least radially displaceable relative to its respective transmission element as it is being transported on the transport path. The linear transport path section comprises a straight path section, i.e. one with an infinitely large radius, and/or a path section having a radius that is significantly greater than the outer radius of the transfer star-wheel itself.

It is also advantageous with the inventive device that the containers have, at the takeover point, a trajectory along a first linear transport path section, and at the handover point a trajectory along a second linear transport path section, with the containers having, between the first and second linear transport path section, a trajectory along a radial transport path section. In this way it is beneficially ensured that the containers follow an optimized trajectory or transport path that achieves a mathematically steady or gradual change in the effect of the centrifugal force. The trajectory or transport path between this takeover and also discharge may be linear or circular.

At the takeover point of the transfer star-wheel the containers are received from the first container treatment device. At the handover point of the transfer star-wheel the containers are transferred to the second container treatment device. A linear conveyor with deflection devices arranged between branches can be provided instead of a transfer star-wheel.

The container is moved in the transfer star-wheel along a path having a gradual change of direction at the handover point so as to achieve a smooth takeover or handover, or a gradual change in the action of the centrifugal force. This prevents filled product spilling out of the container.

Such a path at the handover point can for example follow in the form of a 2π-periodic path, for example in the form of sine curves or also of a parabolic function. In either embodiment, according to the invention linear transport path sections can be provided between takeover point and handover point, with a curved path from takeover point to handover point also being possible.

In a preferred embodiment, the transfer star-wheel has radially adjustable gripping and holding elements in rotary design so that the containers can follow the previously described quasi-smooth path.

In a first embodiment the transmission element can be configured as a carrier fork along which the containers can glide. The prongs of the fork are used to drive and move the containers on the trajectory or transport path.

Many containers have a neck ring. In a particularly advantageous embodiment the containers are positively guided to slide by their neck rings on a curve, with transmission elements, configured, for example, as fork prongs, moving the containers over the predetermined trajectory or the transport path described above.

In some embodiments, the transmission elements have elastic prongs or fork prongs that preferably consist of an elastic plastic or also joints. The elasticity of the fork prongs is conducive to a calming of the filled material because the fork prongs can give way, i.e. yield like a spring, at the takeover point and handover point so as to return gently and equally, like a spring, to their initial position.

The transmission elements rotate preferably at the same angular speed at which a peripheral speed of the other container treatment devices such as, for example fillers, or sealers, ensues.

In one embodiment, the containers passively move the transmission element, which is executed as a carrier fork, and which is rotatable and/or mounted so as to be able to pivot. In another embodiment, the transmission element is actively controlled. This is achievable by an additional controller.

In an advantageous embodiment, the gripping and holding elements are executed as a kind of rail that carries the neck ring of the bottle or that has a groove into which the neck ring of the bottle can be pushed. In this case the gripping and holding element carries the container.

It is also possible for the containers to be moved by radially movable or telescope-like transmission elements, such as the previously mentioned fork prongs. The latter can be retracted and extended by cam control. Alternatively, the fork prongs can be radially fixed.

As already mentioned, centrifugal forces act on the product filled in the respective container, i.e. for example on the filled liquid, at least along the radial transport path section. These centrifugal forces impart a corresponding inclination to the surface of the liquid, which in turn creates a risk of the liquid spilling out.

To counteract this, the invention proposes that the path curves and/or transmission elements exhibit a camber to impose a skew-directed counterforce to the centrifugal forces. As a result, it becomes possible for the surface of the liquid to remain horizontal relative to the container despite the action of the centrifugal forces.

Either the camber or the actual transport path can be achieved by a lifting-and-controlling cam over which a respective gripping-and-holding element travels. Like the transport path of the containers, the lifting-and-controlling cam can be controlled by a controller that sends a corresponding control signal to the gripping-and-holding element so as to also achieve the required inclination to the respectively prevailing centrifugal force. The adjustments could be effected in a motorized manner. The gripping-and-holding element can be pivoted about a point of rotation in order to achieve the required inclination. Losses due to spillage can therefore be advantageously avoided by this inclination.

The invention can be put to particularly advantageous use with a transfer star-wheel that is downstream of a filler, i.e. that transports filled but unsealed containers along the transport path. However, the particular example of container treatment devices that are fillers and sealers should not be regarded as limiting.

BRIEF DESCRIPTION OF THE DRAWINGS

Further advantageous embodiments of the invention are disclosed in accompanying detailed description, the claims, and the figures, in which:

Because the same reference characters in the different figures indicate identical parts, they are normally described only once and only entered once in the figures.

DETAILED DESCRIPTION

Figure 1:
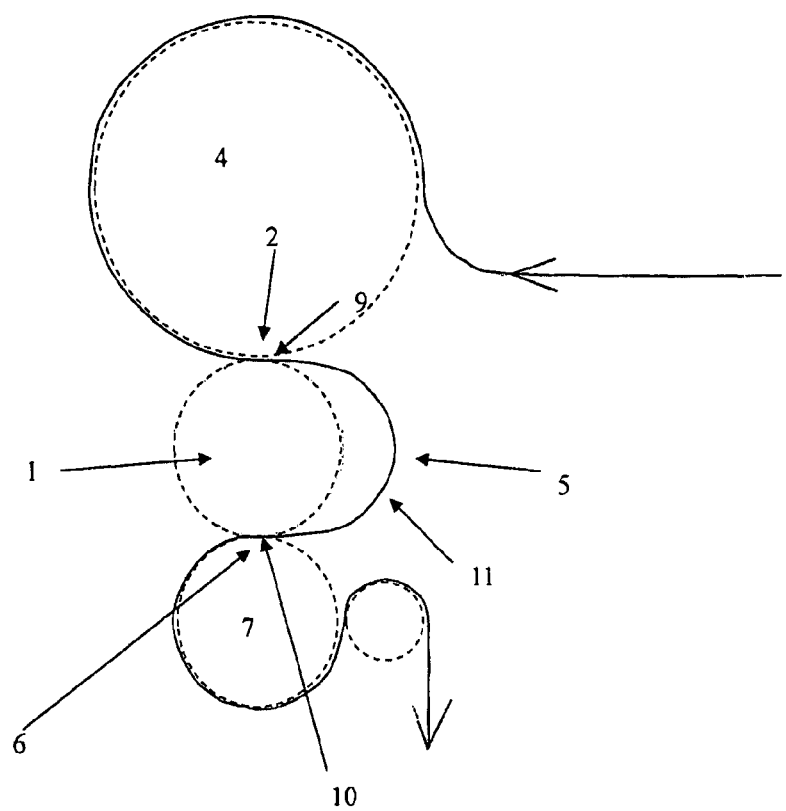
FIG. 1 shows a transfer star-wheel with the trajectory of the containers in plan view.

FIG. 1 shows a transfer star-wheel 1. The transfer star-wheel 1 accepts containers 3 from a first container treatment device 4 at a takeover point 2 and transports containers 3 along a transport path 5 to a handover point 6 where containers 3 are transferred to a second container treatment device 7.

Figure 2:
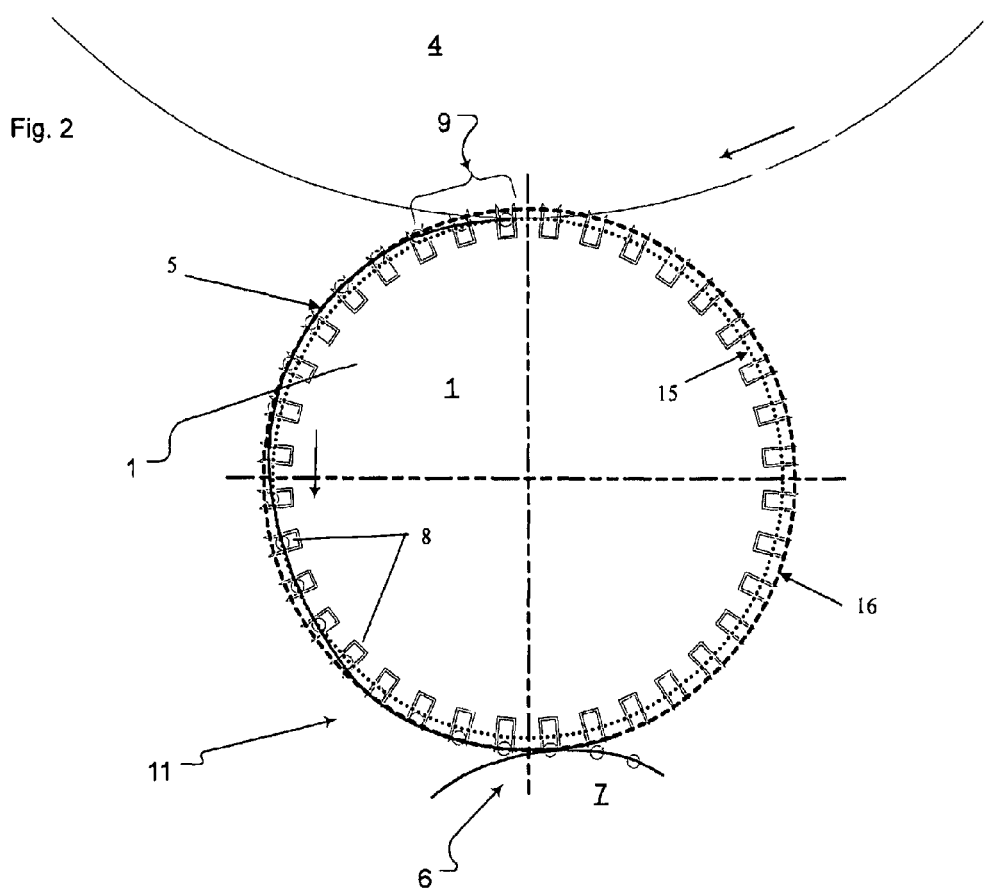
FIG. 2 shows an enlargement of the transfer star-wheel of FIG. 1 in which can be seen a transport path.
Figure 3:
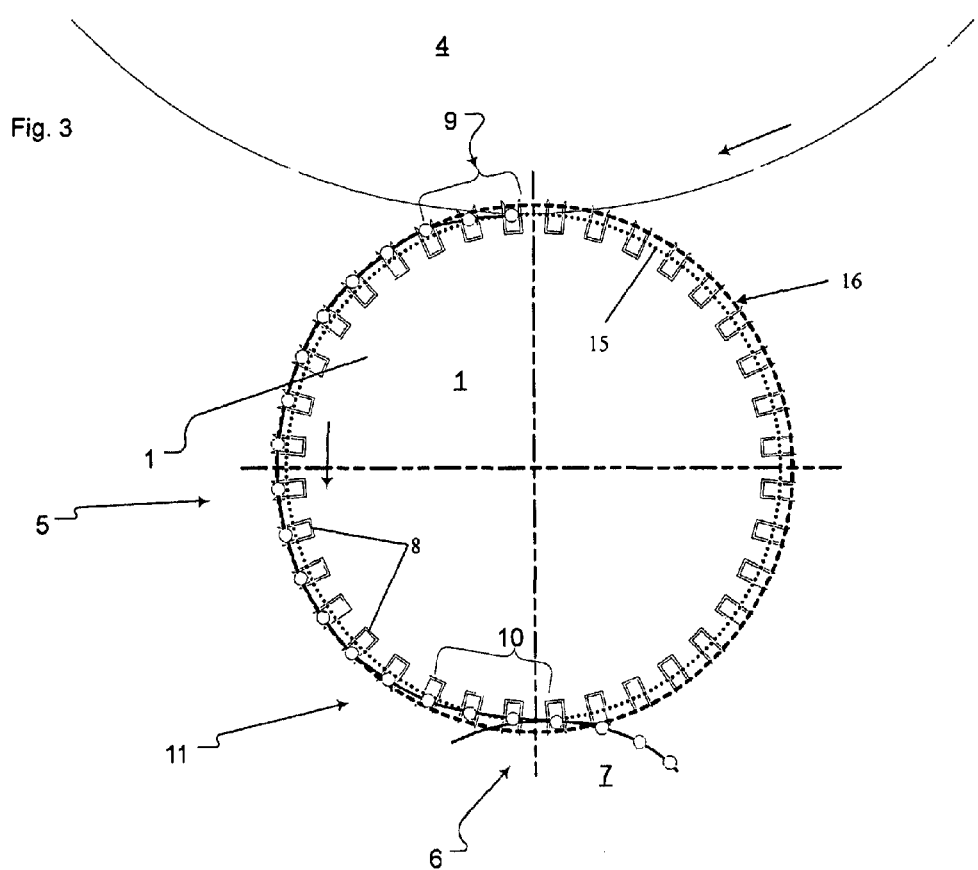
FIG. 3 shows the transfer star-wheel of FIG. 1 with an exemplary transport path.
Figure 4:
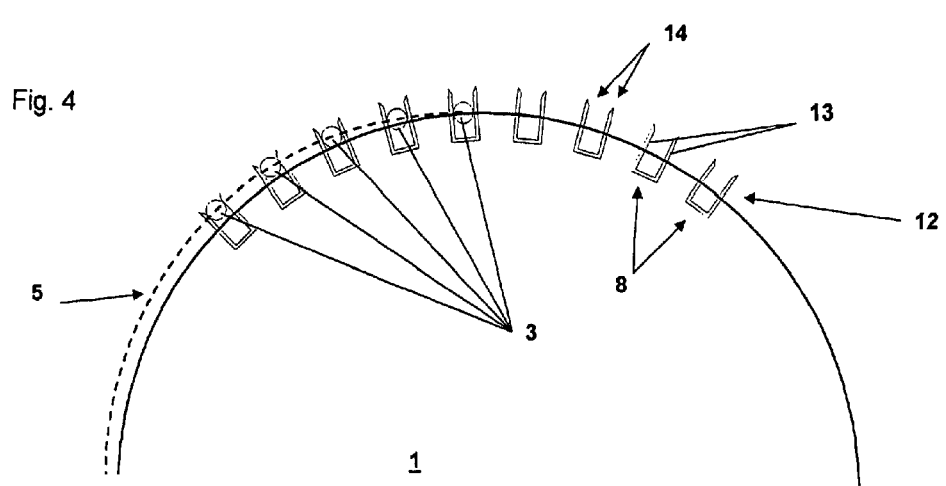
FIG. 4 shows the transfer star-wheel of FIG. 1 in detail.

In FIGS. 2 to 4, containers 3 are only recognizable in plan view onto the mouth region. The first container treatment device 4 has, as suggested, a larger diameter than the transfer star-wheel 1. The second container treatment device 7 has, in the illustrated example, a diameter equal to that of transfer star-wheel 1. However, the second container treatment device 7 can also have a different diameter, e.g. a larger diameter.

A plurality of transmission elements 8, seen in FIGS. 2 to 4 are provided at transfer star-wheel 1. These fulfill a combined function as guiding, gripping and holding elements. The containers 3 can be, for example, PET bottles. However, this is not to be considered limiting, as other kinds of containers can be used.

At the takeover point 2, the containers 3 travel along a trajectory having a gradual change of direction of transport path 5. A section of the transport path where this occurs is referred to as a "first linear transport path section 9."

Similarly, a trajectory along a second linear transport path section 10 also ensures a gradual change of direction of the transport path at the handover point 6. In this case containers 3 are guided between the first linear transport path section 9 and second linear transport path section 10 along a trajectory that can exhibit a radial transport path section 11. In an alternative embodiment, a curved path with the gradual change of direction can also run continuously from the takeover point 2 to the handover point 6.

Such a transport path at the handover point can, for example, follow in the form of a $2\pi$-periodic path. Examples include a sine curve or a parabolic function. In both embodiments, linear transport path sections can be provided between the takeover point 2 and the handover point 6, with a curved path from takeover point 2 to handover point 6 also being possible.

An enlargement of the transfer star-wheel 1 is shown in FIGS. 2 and 3 and in detail in FIG. 4. The transfer star-wheel 1 includes transmission elements 8 to move the containers. In the illustrated embodiment, these transmission elements 8 include carrier forks 12 having fork prongs 13.

FIG. 2 shows a configuration of a path curve in which a container 3 is carried on a pitch circle diameter of the transfer star-wheel 1. The path radius is increased in its initial course, gradually reduced back to the pitch circle diameter and then again increased again to achieve a smooth gradual change of direction into an adjacent container treatment device, which could be, without limitation, a filler or sealer star-wheel.

FIG. 2 shows the transport path 5 and the guided containers 3 in plan view. As shown in the figure, a container 3 in the region of takeover point 2 is carried centrally in a carrier fork 12. The above defined linear transport path section 9 then follows, with the container 3 being positively guided by way of the control cam and, driven by the carrier forks 12, moved towards the prong tips 14, i.e. radially outward. When superimposed on the rotation of transfer star-wheel 1, the linear transport path section 9 is obtained in this way. In the process, the container 3 is moved radially away from an inner orbit 15.

After an approximately 90° rotation of the transfer star-wheel 1, the transport path 5 returns to the inner orbit 15. Then, after a further rotation of approximately 45°, it departs from it again, this time in a direction that takes it outside the inner orbit 15, as it proceeds in the direction of the handover point 6.

The transport path 5 of the container is therefore achieved by interaction between the positive guiding of the container 3 by the control cam or neck cam and the rotation of transfer star-wheel 1. In the region of the handover point 6, the containers 3 are oriented towards the prong tips 14.

In another embodiment, which is not shown, a second linear transport path section 10, similar to that shown in FIG. 3 for the transfer star-wheel 1 according to FIG. 2, at the handover point 6, guides containers 3 from the inner orbit 15 radially outward to the prong tips 14 so as to obtain a smooth course on the curve of the second linear transport path section 10 along the trajectory.

In the case of a transport path 5 for a container 3 as shown in FIG. 3, the container 3 is first conveyed along a first linear transport path section 9 from an inner orbit 15 to an outer orbit 16 that is then maintained for the further rotation of transfer star-wheel 1. At the handover point 6, there is a trajectory along a second linear transport path section 10 along which the container 3 is guided radially inward from the outer orbit 16 to the middle of the fork prongs 13 so as to obtain a smooth course of the curve of the second linear transport path section 10 along the trajectory.

Only a partial section of transport path 5 is shown in detail in FIG. 4.

In other embodiments, alternative measures may be taken for inclining containers 3 so as to counteract the centrifugal force acting on the liquid to cause the liquid level to be more or less horizontal in the container 3. As FIG. 2 also shows, an inner orbit 15 roughly corresponds to a circular path of the central region of the carrier forks 12, with the prong tips 14 being naturally disposed on an outer orbit 16. In the exemplary embodiment, the inner and outer orbits 15, 16 limit the transport path 5. It is conceivable for the inner orbit 15 and/or the outer orbit 16 to have a diameter that is smaller and/or larger than what is drawn in the figure.

Figure 5:
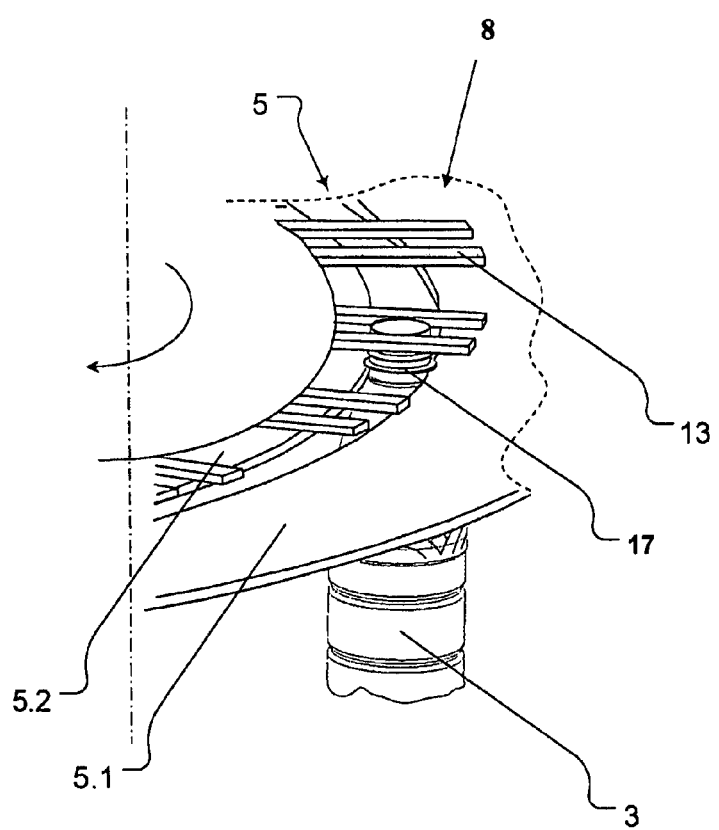
FIG. 5 shows a perspective view of a section of a transfer star-wheel.

FIG. 5 shows part of a transfer star-wheel 1. The transfer star-wheel 1 has gripping and holding elements 8 in the form of forks. A transport path 5 is provided on which containers 3, for example, PET bottles 3, lie by their neck ring 17. The transport path 5 has an inner guide rail 5.1 and an outer guide rail 5.2 between which the containers 3 are guided and transported in a suspended and sliding manner. The containers 3 are driven and positioned by carrier forks 12.

In an alternative embodiment, which is not shown, fork-like gripping-and-holding elements 8 can be telescopically lengthened and shortened so that they can follow the radial motion of the transport path 5. To traverse the fork prongs, one or both guide rails 5.1, 5.2 can be provided as a control cam. Alternatively, a further control cam can be provided.

The following list of reference characters is provided to facilitate understanding:
1 Transfer star-wheel
2 Takeover point
3 Container
4 First container treatment device
5 Transport path
5.1 Inner guide rail
5.2 Outer guide rail
6 Handover point
7 Second container treatment device
8 Transmission elements
9 First linear transport path section
10 Second linear transport path section
11 Radial transport path section
12 Carrier forks
13 Fork prongs
14 Prong tips
15 Inner orbit
16 Outer orbit
17 Neck ring Having described the invention, and a preferred embodiment thereof, what is claimed as new, and secured by Letters Patent is:

1. An apparatus comprising a transfer star-wheel configured for passing containers from a first container-treatment device to a second container-treatment device, said transfer star-wheel comprising a takeover point, a handover point, transmission elements, a transport path, an inner guide rail, an outer guide rail, and a first linear transport section, wherein said star-wheel rotates about a vertical axis, wherein, at said takeover point, said transfer star-wheel takes containers from said first container-treatment device, wherein said transfer star-wheel transfers said containers taken from said first container-treatment device to said handover point, wherein, at said handover point, said transfer star-wheel passes containers to said second container-treatment device, wherein said transport path comprises said inner guide-rail, said outer guide-rail, and said first linear transport path section, wherein containers are guided and transported in a suspended and sliding manner between said inner guide-rail and said outer guide-rail, wherein said first linear transport path section is provided at said takeover point, wherein each of said transmission elements is associated with a corresponding container, wherein each of said containers is radially displaceable relative to a transmission element to which said container corresponds as said container is being transported on said transport path wherein said first linear transport path section comprises at least one of a first straight path section and a path section having a radius of curvature that is greater than an outer radius of said transfer star-wheel.

2. The apparatus of claim 1, further comprising a second linear transport path section, wherein said second linear transport path section is provided at said handover point, and wherein said second linear transport path section comprises one of a path section having a radius of curvature that is greater than an outer radius of said transfer star-wheel and a second straight path section.

3. The apparatus of claim 2, further comprising a radial transport path section, wherein said radial transport path section is provided between said first linear transport path section and said second linear transport path sections.

4. The apparatus of claim 1, wherein said transport path extends along a $2\pi$-periodic curve.

5. The apparatus of claim 1, wherein said transport path extends along a sine curve.

6. The apparatus of claim 1, wherein said transport path extends along a parabolic function.

7. The apparatus of claim 1, wherein said transmission elements comprise carrier forks.

8. The apparatus of claim 7, wherein each of said transmission elements is rotatable against a direction of rotation of a container.

9. The apparatus of claim 7, wherein each of said transmission elements is pivotable against a direction of rotation of a container.

10. The apparatus of claim 7, wherein said transmission element is actively fixed against a direction of rotation of a container.

11. The apparatus of claim 7, wherein said carrier forks comprise elastic fork prongs.

12. The apparatus of claim 11, wherein said elastic fork prongs comprise elastic plastic.

13. The apparatus of claim 1, wherein each of said containers is radially displaceable relative to a transmission element to which said container corresponds prior to beginning removal of said container from said transport path.

14. The apparatus of claim 1, wherein each of said transmission elements engages a container for a time that begins with entry of said container into said transmission element and ends with removal of said container from said transmission element, and wherein, throughout said residence time, said container is radially displaceable relative to said transmission.

15. The apparatus of claim 1, wherein said first linear transport path section comprises a section having a radius-of-curvature that is greater than a radius-of-curvature of said transfer star-wheel.

16. The apparatus of claim 1, wherein said transfer star-wheel has a pitch curve, and wherein said transport path intersects said pitch circle.

17. The apparatus of claim 1, wherein said transfer star-wheel has a pitch circle, and wherein said pitch circle is outside said transport path during a first angular range, and wherein said transport path is outside said pitch circle during a second angular range.

18. The apparatus of claim 1, wherein said transfer star-wheel further comprises a cam for causing said containers to follow a linear path section.

19. The apparatus of claim 1, wherein said linear path section comprises a section having an infinite radius-of-curvature.

20. The apparatus of claim 1, wherein said transport path has a camber selected to impose a skew-directed counterforce to centrifugal force sustained by said container.

21. An apparatus comprising a transfer star-wheel that takes a container from a first container-treatment device at a takeover point and transports said container to a handover point for passing to a second container-treatment device, said transfer star-wheel comprising a plurality of transmission elements, and inner and outer guide-rails between which said container is guided and transported in a suspended and sliding manner, wherein a linear transport path section is provided at said takeover point, wherein while a container is being transported on a transport path by a transmission element, said container is radially displaceable relative to said transmission element, and wherein said transport path comprises at least one of a straight path section and a path section having a radius that is greater than an outer radius of the transfer star-wheel.

22. An apparatus for causing transfer of a container from a first container-treatment device to a second container-treatment device, said apparatus comprising means for suspending a container, a transfer star-wheel that moves said means for suspending relative to a fixed frame of reference with a velocity vector that has only a circumferential component, and means for imparting a radial component of velocity to said container relative to said fixed frame of reference while said container is suspended by said means for carrying a container, wherein said means for suspending a container receives a container from a first container-treatment device and suspends said container during transport of said container to said second container-treatment device, wherein, while suspended, said container moves relative to said fixed frame of reference with a velocity vector that resolves into a circumferential component and a radial component, wherein, as a result of operation of said means for radially moving said container, said radial component of said velocity vector of said container is non-zero, and wherein said means for imparting a radial component of velocity to said container is configured to control centrifugal force sustained by said container during transfer to said second container-treatment device.

* * * * *